Jan. 26, 1960   W. HÜTTER ET AL   2,922,481
AUTOMATIC DRIVE FOR TRAILERS AND THE LIKE
Filed March 26, 1958   3 Sheets-Sheet 1

INVENTORS
BY
Michael S. Striker
ATTORNEY

FIG. 3

United States Patent Office 2,922,481
Patented Jan. 26, 1960

2,922,481

AUTOMATIC DRIVE FOR TRAILERS AND THE LIKE

Wolfgang Hütter, Bezgenrieth, Wurttemberg, and Kaspar Ritter, Kirchheim, Teck, Wurttemberg, Germany, assignors to Firma Allgaier-Werke G.m.b.H. Uhingen-Wurttemberg, Germany Application March 26, 1958, Serial No. 724,152

Claims priority, application Germany April 13, 1957

22 Claims. (Cl. 180—14)

The present invention relates to drive connections for use between an engine-driven road vehicle and an axle driven trailer, and more particularly to a mechanical connection which is automatically controlled by the forces acting upon the draft coupling by means of which the trailer is removably hitched to the rear end of an engine-driven vehicle.

An important object of the present invention is to provide an improved mechanical connection between the driving shaft of an automotive vehicle and the live axle or axles of a trailer, which is so constructed as to automatically adjust the peripheral speeds of the tractor's and trailer's wheels by full consideration of the load, tire pressure and road conditions.

Another important object of the invention is to provide an improved system of the above character which is so constructed as to avoid any and all stresses in the drive connection between a tractor and its trailer.

An additional object of the present invention is to provide a drive connection between an automotive vehicle and its trailer which is so constructed as to facilitate full utilization of static friction at each axle of the vehicle train.

A still further object of the instant invention is to provide a drive connection for use between the engine-driven component and the trailer component of a road vehicle train which is so constructed that it may be employed with all types of engine-driven tractors or the like having a rearwardly extending driving shaft.

A concomitant object of the instant invention is to provide a drive connection which may be installed in the tractor or in the trailer component of a road vehicle train.

A still further object of the invention is to provide a system of the above described character which may be connected to a tractor's driving shaft regardless of whether the latter rotates at a rate proportional with the engine speed or with the rate of forward speed of the tractor.

An additional object of the present invention is to provide a connecting drive between a tractor and a trailer coupled thereto which is so constructed and installed as to avoid any pulsating or swinging movements of the trailer with respect to its tractor component.

A concomitant object of the instant invention is to provide a connecting system between the driving shaft of a tractor and the live axle of a trailer attached thereto which is compact and thus occupies little space, which is of light construction, and which is relatively cheap in manufacture.

A yet further object of our invention is to provide an apparatus of the above described character combined with a system for automatically adjusting the connecting drive to synchronize the peripheral speeds of the tractor's and its trailer's wheels, which is so connected with the tractor that the automatic adjusting means may be inactivated when an intentional change in the driving speed takes place to thus prevent sliding of the tractor's or trailer's wheels.

A more specific object of the invention is to provide a connection between the driving shaft of a tractor or other engine-driven road vehicle and the live axle of its trailer which may be adjusted automatically by the axial forces acting upon the coupling between the two vehicle train components, or manually when the vehicle train is brought to a halt.

An additional specific object of the invention is to provide a connection of the above described general character combined with automatically adjustable variable speed transmission means in such a way that the latter absorbs only a fraction of the torque.

The above and many other objects of our invention are attained by the provision of a mechanical drive connection between an automotive road vehicle, such as an automobile, truck or tractor, and a wheel-mounted trailer having at least one live axle, the mechanical connection including a power transmission system which is automatically adjustable by means of an articulate connection to the draft coupling, the articulate connection being responsive to the forces generated in the draft coupling when the coupling member attached to the trailer exerts pressing or tensioning forces upon the other coupling member connected to the engine-driven component of the road vehicle train. More particularly, the invention provides a connection between the driving shaft of an engine-driven road vehicle and the driven axle of a trailer releasably coupled thereto by means of a customary trailer hitch or draft coupling, and a transmission system in the mechanical drive connection whose output shaft is automatically adjustable to drive the trailer's axle at such angular velocities that the peripheral speeds of wheels on which the tractor and trailer components are mounted remain identical irrespective of load, road conditions, or any other factors which normally influence peripheral speeds of the wheels in a vehicle train. To that end, the transmission is operatively connected with one of the coupling elements between the engine-driven and trailer components in such a way that, when the trailer tends to advance at a speed greater than the velocity of the tractor, the pressure generated between the coupling elements is conveyed to the transmission which latter then reduces the angular velocity of its output shaft to bring about a pressure-free drive connection between the two conveyances. Inversely, any tensional forces arising in the draft coupling when the trailer tends to move at a speed below that of the engine-driven automotive vehicle, cause displacement of the connecting mechanism and subsequent adjustments in the transmission to readjust the ratio between the angular velocity of the trailer's axle and the angular velocity of the driving shaft.

Provision is made in the articulate connection between the transmission and one of the elements constituting the draft coupling or hitch between the vehicle train components for adjusting the connection in such a way that the transmission may be used with trucks and trailers whose wheels are of greatly different diameters.

Due to the provision of our novel assembly, the pole pin which removably connects coupling elements of the trailer hitch, is normally subjected to stresses only when the vehicle train changes its direction; all stresses (pressure or pull) in the direction of movement are rapidly eliminated by automatic adjustment of the transmission and subsequent equalization in peripheral speeds of the trailer's and tractor's wheels.

As it may be desirable to temporarily inactivate the transmission and to maintain a constant ratio between the angular velocities of the driving shaft and the live axle, the operative connection between the trailer hitch and the transmission may be arrested by a suitable apparatus which, according to a preferred embodiment of our invention, becomes active automatically, for example when the brakes are applied to the wheels of either or both components of the road vehicle train.

Many other features, advantages and attributes of the novel system will become apparent and will be pointed out in the course of the following detailed description of certain embodiments selected for illustration in the accompanying drawings, wherein.

Figure 1:
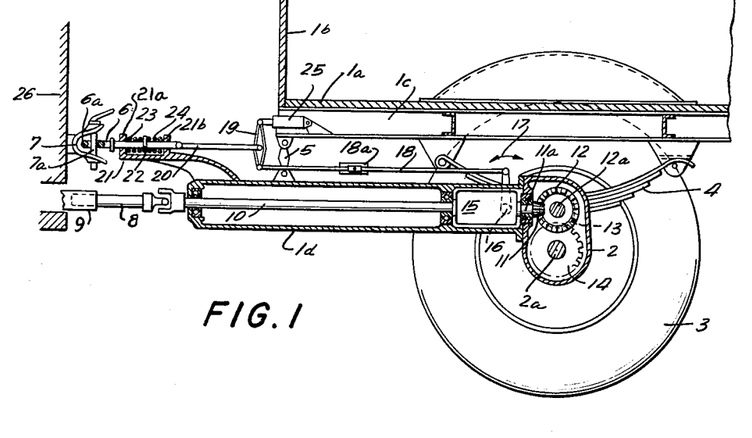
Fig. 1 is a longitudinal central section through the front end of a trailer to which the novel drive connection and automatic control system therefor are attached, this figure further illustrating the rear end of a truck, its driving shaft and the draft coupling.

Referring now in greater detail to the embodiment of Fig. 1, there is shown the rear end of an automotive vehicle 26, e.g. a truck, to which is hitched a trailer 1 having a platform 1a, side walls 1b, front wheels 3, springs 4, and hinged supports 5 connected between the chassis 1c and central channel bar 1d. The rear end of hollow member 1d is connected to gear casing 2 which latter is traversed by the driven front axle 2a whose ends carry the front wheels 3. Axle 2a is driven at a variable speed by the driving shaft 9 which is rotated by the engine (not shown) of tractor 26 and which, over a Cardan shaft 8, connecting shaft 10, variable speed transmission 15, bevel gear 11 fixed to output shaft 11a, bevel gear 12 meshing with member 11 and fixed to shaft 12a in the gear casing 2, and reducing gearing 13, 14 in that order, causes rotation of member 2a. Spur gears 13 and 14 are fixed to shaft 12a and to axle 2a, respectively.

Channel bar 1d carries a forwardly extending bracket 21 whose front end portion defines a bearing for an axially reciprocable coupling rod 6. The latter forms an eyelet 6a at its front end and has rigidly connected thereto a collar 22 between the upwardly extending bearing members 21a, 21b of bracket 21. Collar 22 is located between a pair of coil springs 23, 24 which bear against members 21a, 21b, respectively, and thus constantly tend to maintain collar 22 and coupling rod 6 in a state of equilibrium.

A rod 20 has its front end pivotally connected to the trailing end of member 6, the rear end of rod 20 being articulately connected to a double lever 19. A connecting member 18 which is longitudinally adjustable at 18a connects the actuating lever 16 of transmission 15 with one end of double lever 19, the latter having its other end connected to the piston rod of a damping cylinder 25.

Trailer 1 is coupled to vehicle 26 by means of a coupling pin 7a which is removably received in a clutch dog 7 fixed to said vehicle and which also passes through the eyelet 6a at the front end of coupling rod 6.

As above described, the driving shaft 9 of motor vehicle 26 and the front axle 2a of trailer 1 are mechanically connected over transmission 15 which is controlled by actuating lever 16 in such a way that, depending upon displacement of lever 16 in one of the directions indicated by double arrow 17, bevel gear 11 and consequently the axle 2a is rotated at a higher or lower speed to thereby control the angular velocity of front wheels 3. Thus, by suitably shifting lever 16, angular velocity of the trailer wheels may be so adjusted as to advance the trailer at the exact speed of the motor vehicle 26 regardless of the difference in diameters of the automobile and trailer wheels and regardless of the velocity at which the drive shaft 9 rotates. By so adjusting the rotative speed of wheels 3, the stresses on the drive mechanism of the trailer are completely eliminated.

Transmission 15 may be of any suitable construction as long as it meets the requirements regarding the operating range, space occupied and ease of installation. A very satisfactory type of the variable speed transmission is described in German Patent No. 862,538 to which the U.S. Patent No. 2,687,049, granted on August 24, 1954 corresponds. These patents disclose an axial piston fluid transmission comprising primary and secondary cylinder piston arrangements and a mechanical coupling between the primary and secondary parts of the assembly.

The adjustment of lever 16 which controls the transmission 15 is fully automatic and is effected over linkage 18, 19 and 20 depending upon the axial displacement of coupling rod 6 with respect to bracket 21 when the axle 2a is driven at such angular velocity as to cause eyelet 6a (a) to exert pressure against the coupling pin 7a, i.e. when the angular velocity of axle 2a is excessive, or (b) to exercise a pull thereagainst when the rotation of axle 2a is too slow. In the absence of axial forces, coupling rod 6 is held in the illustrated position by resilient elements 23, 24 which act against the opposing sides of collar 22.

Pulsating movements of the trailer with respect to the preceding vehicle 26 are prevented by the damping cylinder 25 which retards the displacement of actuating lever 16. Member 8 has limited freedom of axial movement with respect to the driving shaft 9 to follow displacements of bracket 21 along the coupling rod 6.

Figure 2:
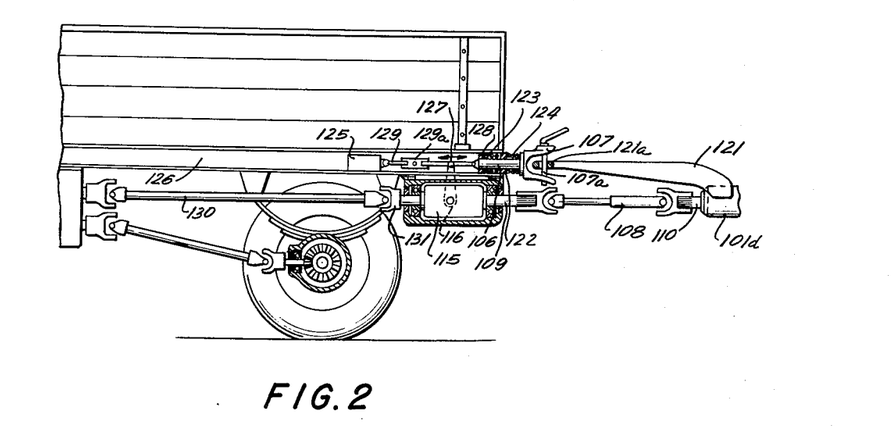
Fig. 2 is a similar section through the rear end of a truck to which the novel parts of our drive connection and the automatic control system therefor are attached, the trailer being represented only by an element of the draft coupling and by a portion of the driven shaft leading to the live axle.

Fig. 2 illustrates a modified system in which the variable speed transmission 115 is attached to the rear end of the automotive vehicle 126. The trailer connected thereto by coupling pin 107a is not shown save for a portion of its channel bar 101d rotatably supporting connecting shaft 110 and the bracket 121 which latter is rigidly fixed to the channel bar and carries at its forward end an eyelet 121a through which the pin 107a extends. Clutch dog 107 which removably supports the pin 107a is formed with a forwardly extending shaft 106; the latter carries a rigid flange 128 and is slidable in a collar 122 fixed to the chassis of truck 126. Resilient elements 123, 124 are disposed at both sides of collar 122 and act against the flange 128 and against member 107, respectively. When the shaft 106 is axially displaced by the eleyet 121a against the force of spring 123 or 124 in response to variations in the rate of trailer's movement with respect to that of the vehicle 126, actuating lever 16 of transmission 115 is displaced in one of the two directions indicated by double arrow 127 to thereby increase or reduce the angular velocity of member 108 which latter, over suitable gearing, drives the trailer's axle. Lever 116 is pivotally connected to connecting link 129 whose extremities are articulately fixed to the front end of shaft 106 and to the piston rod of damping cylinder 125. The latter tends to retard axial displacements of member 129 and thus prevents pulsating changes in the ratio at which the shaft 109 is driven.

Member 108 between shafts 109 and 110 consists of two telescoped parts and thus compensates for axial displacements of shaft 106. Cardan shaft 130 and input shaft 131 at the primary side of transmission 115 are driven by the engine of vehicle 126.

Turnbuckle 129a in the connecting member 129 facilitates lengthening or shortening of the latter for the purposes to be pointed out hereinafter.

Figure 3:
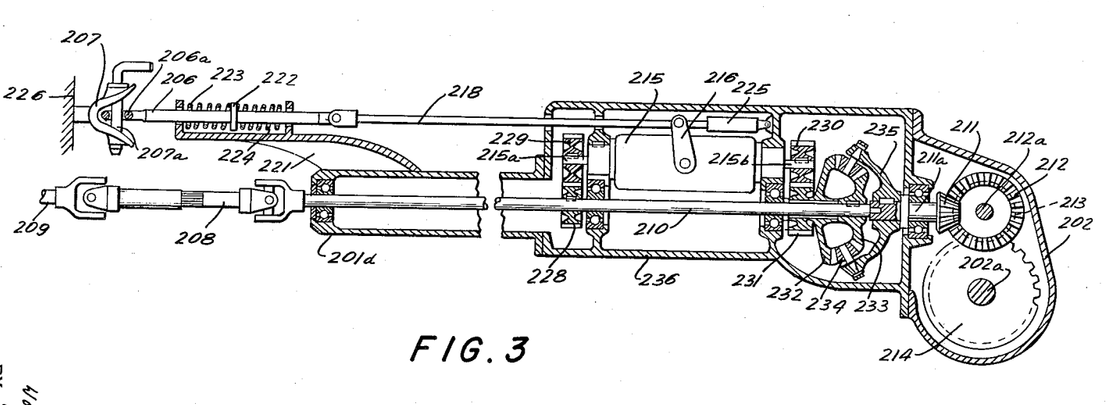
Fig. 3 is an enlarged axial section through the gear box and the axle of a trailer showing a slight modification of our invention according to which the transmission is mounted in parallel with the drive connection between the truck's driving shaft and the live axle.

Fig. 3 illustrates a further modification in which the respective input and output shafts 215a, 215b of the variable speed change apparatus 215 are parallel but not coaxial with the mechanical drive connection between the driving shaft 209 of automotive vehicle 226 and the driven axle 202a of the trailer. Thus, the transmission 215 is subjected to a predetermined fraction, preferably less than one-half, of the total torque and may be constructed as a very light and compact unit.

Rotation of connecting shaft 210 is transmitted to the input shaft 215a by a pair of spur gears 228, 229 mounted on and rotatable with members 210 and 215a, respectively. Output shaft 215b transfers rotational movement over a pair of gears 230, 231 to the sun wheel 232, the latter being coaxial with shaft 210 and integrally formed with gear 231. Members 231, 232 are rotatable as a unit with respect to shaft 210. Sun wheel 232 forms part of a differential gearing whose other components comprise a second sun wheel 233 preferably of smaller pitch diameter and fixed to and rotatable with shaft 210, planetary gears 234 and the planetary gear carrier 235. Due to connection of sun wheel 233 to shaft 210, the angular velocity of member 235 is affected by changes in the ratio of transmission 215 over elements 230, 231, 232 and 234. Planetary gear carrier 235 is keyed to the shaft 211a of bevel gear 211 which latter, over bevel gear 212 and spur gear 213 both mounted on shaft 212a in gear casing 202, and over gear 214 meshing with element 213, drives the trailer's front axle 202a in the same way as described in connection with Fig. 1. Thus, in the just described modification of our invention, transmission 215 is located in a side arm and conveys rotary motion to the differential gearing which latter is coaxial with the mechanical drive connection between the engine-driven vehicle 226 and its trailer.

Common housing 236 of transmission 215 and differential gearing 231—235 is disposed between the central channel bar 201d and the gear casing 202 of the trailer. Driving shaft 209 of automotive vehicle 226 and connecting member 210 are linked by a Cardan shaft 208.

Speed ratio changing strokes of actuating lever 216 operatively connected to transmission 215 are controlled by the forces acting on connecting rod 206 whose eyelet 206a is held in member 207 by removable pole pin 207a. As in the embodiment of Fig. 1, rod 206 carries a collar or washer 222 acted upon by coil springs 223, 224 to convey displacements of bracket 221 with respect to member 206 to the actuating lever 216 over a link 218 whose rear end extends into the damping cylinder 225. Element 208 consists of two telescoped parts which are longitudinally displaceable with respect to each other to compensate for movements of bracket 221 with respect to connecting rod 206.

The attachment of transmission and of the automatic control system therefor to the trailer rather than to the engine-driven vehicle itself is preferred because it would unnecessarily raise the cost of the vehicle which latter can be used either alone or with trailers whose axle or axles need not necessarily be driven.

Figure 4:
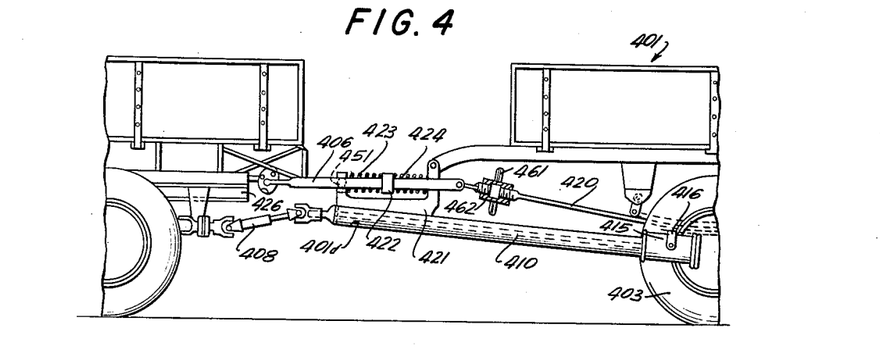
Fig. 4 illustrates, largely in side elevation and partly in section, a system quite similar to that shown in Fig. 1 which is also mounted at the front end of a trailer and is connected to the driving shaft and the coupling member, respectively, of a truck, this figure further showing means for adjusting the neutral position of the transmission and means for inactivating the automatic control system for the latter.
Figure 5:
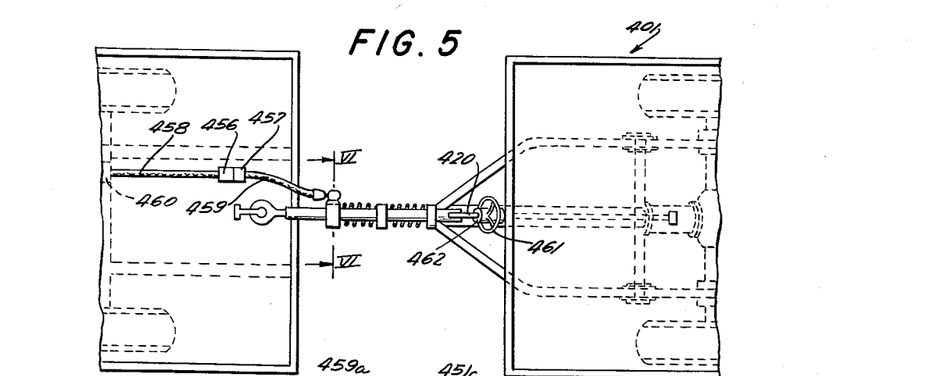
Fig. 5 is a top plan view of the assembly illustrated in Fig. 4.

Figs. 4 and 5 illustrate a vehicle whose tractor and trailer components 426 and 401, respectively, are connected in a manner as described in connection with Fig. 1. Thus, transmission 415 is connected to the trailer's gear casing and the coupling rod 406 is axially slidably supported by the bracket 421 carried by channel bar 401d. Members 403, 408 and 410 correspond to parts 3, 8 and 10 in that order and are driven in the same manner by the engine of tractor 426.

Figure 6:
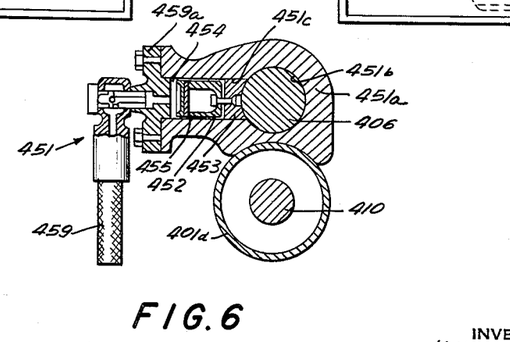
Fig. 6 is an enlarged section taken on line VI—VI of Fig. 5, showing in greater detail means for inactivating the automatic control apparatus for the variable speed transmission.

Reference numeral 451 indicates a device which is adapted to maintain coupling rod 406 in a fixed position to thus prevent automatic displacements of lever 416 and consequently the change in ratio of transmission 415. Such inactivation of automatically operating members 406, 420 and 416 is sometimes desirable especially when the vehicle train is about to be brought to a halt, i.e. when the brakes are applied to the wheels of the respective tractor and trailer components 426 and 401. The hydraulic arresting device 451, best shown in Fig. 6, is carried by the bracket 421 and comprises a housing 451a which forms part of or is fixed to the bracket 421 and actually forms one stop for the resilient element 423 whose other end bears against the collar 422 on coupling rod 406. Housing 451a has a bore 451b for the passage of member 406 and a second bore 451c transverse to the axis of the coupling rod for reception of a piston in the form of a clamping bolt 452 which carries at its end facing the coupling rod 406 a member 453 of friction-generating material. Chamber 454 in the bore 451c adjacent to the other end of piston 452 may be filled with a hydraulic fluid introduced through a line 459 whose end 459a is tightly connected to the adjacent end of housing 451a. When introduced into the chamber 454, the fluid under pressure displaces member 452 and causes the friction generating element 453 to engage and arrest coupling rod 406 and to thus maintain transmission 415 in fixed position. At its end extending into the chamber 454, piston 452 is provided with a layer of sealing material 455 to prevent leakage of hydraulic fluid into the bore 451b.

When the pressure of fluid in line 459 and chamber 454 decreases, springs 423, 424 immediately return coupling rod 406 into neutral position and the rod is then again free to respond to any axial forces for automatically controlling the transmission 415 over members 420 and 416 as described in connection with Fig. 1.

Line 459 is connected to a line 458 over a fluid-tight releasable coupling consisting of members 456, 457, line 458 leading to e.g. the source of hydraulic fluid for actuation of the brakes on tractor component 426. Alternately, line 458 may be connected with the conduit (not shown) which supplies fluid to the brakes of trailer component 401, if desired. As shown in Fig. 5, line 458 is connected to the differential block 460 of the vehicle 426 and thus supplies fluid into chamber 454 whenever the differential is rendered inactive, for example, on rough terrain when a wheel is likely to skid on the road surface. Such automatic arresting of coupling rod 406 when the brakes are applied on the vehicle 426 or trailer 401, as well as when the differential of vehicle 426 is inactivated, is very desirable since the braking effect on these components is seldom uniform and any adjustments in speed by transmission 415 during intentional acceleration or deceleration of the vehicle train would adversely affect the propulsion or braking forces.

Of course, the just described hydraulic arresting apparatus may be replaced by a mechanical or electrical system of suitable construction. The hydraulic device is preferred because it requires no additional steps but may be operated whenever the brakes are applied or the gears shifted in the engine-driven component of the vehicle train.

In order to permit adjustments of transmission 415 even if the coupling rod 406 is not displaced, a turnbuckle 462 provided with a hand wheel 461 may be inserted in the connecting member 420 to thus displace actuating lever 416 when the vehicle train is not in motion. This allows for corrections in the relative peripheral speeds of the tractor's and trailer's wheels. Obviously, turnbuckle 462 may be replaced by any equivalent means which facilitate lengthening or shortening of connecting member 420. It will be noted that the turnbuckles 18a and 129a shown in Figs. 1 and 2, respectively, are without hand wheels, there being an opening for the insertion of a suitable tool which facilitates rotation thereof and subsequent lengthening or shortening of connecting links 18 and 129.

Many other changes and modifications will readily occur to persons skilled in the art upon perusal of the above description which, accordingly, is not to be construed in a limitative sense, the true nature and spirit of the invention being defined by the scope of the appended claims.

We claim:

1. In a vehicle train comprising tractor and trailer components, said tractor component having a rearwardly extending driving shaft and said trailer component having a live axle, in combination: means constituting a drive connection between said driving shaft and said axle; variable speed transmission means in said drive connection; draft coupling means for removably attaching said trailer component to said tractor component; and means for operatively connecting said coupling means with said transmission means, said last mentioned means constituting automatic ratio changing means between the input and output ends of said transmission means in said drive connection in response to forces generated in said coupling means and operating in such manner that said ratio decreases in response to pressing forces and increases in response to tensioning forces in said coupling means.

2. In a vehicle train comprising an engine-driven vehicle and a trailer, said vehicle having a rearwardly extending engine-driven shaft and said trailer having a live axle, in combination: means constituting a mechanical drive connection between said driving shaft and said axle and including a variable speed transmission; a trailer hitch for removably attaching said trailer to said vehicle; and means for operatively connecting said trailer hitch with said transmission, said last mentioned means constituting automatic ratio changing means between the input and output ends of said transmission in response to forces generated in said trailer hitch and operating in such a way as to decrease said ratio in response to pressing forces and to increase said ratio in response to tensioning forces in said trailer hitch.

3. In a vehicle train comprising an engine-driven wheel mounted vehicle and a wheel mounted trailer, said vehicle having a rearwardly extending engine-driven shaft and said trailer having a transverse axle and a pair of front wheels fixed to said axle, in combination: a mechanical drive connection between said shaft and said axle including a variable speed transmission, said transmission having an input end driven by said shaft and an output end for driving said axle; draft coupling means for releasably connecting said vehicle with said trailer and including a first member attached to said vehicle and a second member attached to said trailer; and an operative connection between said draft coupling means and said transmission for changing the ratio at which the output end of said transmission is driven with respect to said input end thereof, said operative connection comprising a linkage having one end connected to one of said members and the other end connected to said transmission and being operable in response to forces generated between said members parallel with the direction of movement of said vehicle train for decreasing said ratio in response to pressing forces and for increasing said ratio in response to tensioning forces between said members whereby the peripheral speeds of said front wheels and of the wheels of said vehicle are equalized by said transmission.

4. In a vehicle train comprising an engine-driven wheel-mounted tractor component and a trailer component, said tractor component having a rearwardly extending engine-driven shaft and said trailer component having a live axle, in combination: a mechanical drive connection between said shaft and said axle attached to said trailer component including variable speed transmission means; a trailer hitch for removably connecting said trailer component to said tractor component and including a first member attached to said tractor component and a second member removably coupled with said first member and attached to said trailer component; and means connected to said second member and to said transmission means for varying the ratio between the input and output ends of said transmission means in response to forces generated between said first and said second members of said coupling means and substantially parallel with the direction of movement of said vehicle train, said last mentioned means operating in such manner as to reduce said ratio in response to pressing forces between said members and to increase said ratio in response to tensioning forces between said members whereby to equalize peripheral speeds of the wheels on which said tractor component and said trailer component are mounted.

5. A vehicle train comprising, in combination, an engine-driven wheel-mounted tractor component having a rearwardly extending engine-driven shaft; a wheel-mounted trailer component having a live axle; a mechanical drive connection between said shaft and said axle, said drive connection being attached to one of said components and including variable speed transmission means; draft coupling means between the forward end of said trailer component and the rear end of said tractor component, said draft coupling means comprising a pair of coupling members articulately connected to each other and each attached to one of said components, one of said coupling members connected to that component to which said drive connection is attached being slidable between two extreme positions in the longitudinal directions of its component, said draft coupling means further comprising resilient means so connected with said slidable coupling member as to constantly urge same into a position intermediate said extreme positions; and means operatively connected between said slidable coupling member and said transmission means for varying the ratio between the input and output ends of said transmission means in response to displacements of said slidable coupling member and in such a way as to increase said ratio upon displacements of said slidable coupling member in response to pressing forces between said coupling members and to reduce said ratio upon displacements of said slidable coupling member in response to tensioning forces between said coupling members whereby to automatically equalize peripheral speeds of wheels on which said tractor component and said trailer component are mounted.

6. In a vehicle train comprising an engine-driven wheel-mounted tractor component having a rear end and an engine-driven shaft in the proximity of said rear end, and a wheel-mounted trailer component having a forward end and a transverse live axle, in combination: a drive connection between said shaft and said axle, said connection being attached to said tractor component and including a variable speed transmission having an input end driven at the rate of said shaft and an output end controlling the rate at which said axle is driven; a draft coupling comprising a first coupling member connected to the front end of said trailer component, a second coupling member articulately coupled with said first coupling member, said second coupling member being connected to the rear end of said tractor component for sliding movements between two extreme positions longitudinally of said tractor component, said draft coupling further comprising resilient means for constantly urging said second coupling member into an intermediate position; and means for operatively connecting said second coupling member with said transmission for varying the rate at which the output end thereof is driven in response to sliding movements of said second coupling member, said last mentioned means operating in such manner as to increase the angular velocity of said output end in response to tensional forces between said coupling members and to reduce the angular velocity of said output end in response to pressing forces between said coupling members whereby to equalize the peripheral speeds of wheels on which said tractor component and said trailer component are mounted.

7. In a vehicle train comprising an engine-driven wheel-mounted tractor component having a rear end and an engine-driven shaft extending longitudinally and centrally thereof in the proximity of said rear end, and a wheel-mounted trailer component having a forward end and a transverse live axle, in combination: a drive connection between said shaft and said axle, said connection being attached to said trailer component and including a variable speed transmission having an input end driven at the rate at which said shaft is driven and an output end controlling the rate at which said axle is driven; a draft coupling comprising a first member connected to the rear end of said tractor component, a second member articulately connected with said first member, said second member being supported by said trailer component and slidable between two extreme positions longitudinally and centrally of said trailer component, said draft coupling further comprising resilient means for constantly urging said second member into an intermediate position; and means for operatively connecting said second member with said transmission for varying the rate at which said output end thereof is driven in response to sliding movements of said second member, said last mentioned means operating in such a way as to increase the angular velocity of said output end in response to tensional forces between said members and subsequent sliding movements of said second member in one direction, and to reduce the angular velocity of said output end in response to pressing forces between said members and subsequent sliding movements of said second member in the other direction whereby to equalize peripheral speeds of wheels on which said tractor component and said trailer component are mounted.

8. In a vehicle train comprising a wheel-mounted tractor component having a rearwardly extending engine-driven shaft, and a wheel-mounted trailer component having a live axle, in combination: a drive connection between said shaft and said axle including a variable speed transmission; a draft coupling between said trailer component and said tractor component; means constituting an operative connection between said coupling and said transmission for varying the rate at which the output end of said transmission is driven in response to axial forces generated in said coupling when the wheels on which said tractor component and said trailer component are mounted rotate at different peripheral speeds, said last mentioned means operating in such a way as to reduce the rate at which said output end is driven in response to pressing forces generated in said coupling and to increase said rate in response to tensioning forces generated in said coupling; and means for retarding the action of said last named means upon said transmission.

9. In a vehicle train comprising a wheel-mounted tractor component having a rearwardly extending engine-driven shaft and a trailer component having a live axle, in combination: a drive connection between said shaft and said axle including a variable speed transmission, said transmission having an input end driven at the rate at which said shaft is driven, an output end controlling the rate at which said axle is driven, and an actuating lever for varying the speed ratio between said input end and said output end; a trailer hitch comprising a first member attached to one of said components, a second member attached to the other of said components and articulately connected with said first member, one of said members being slidable between two extreme positions longitudinally of its component, and resilient means for constantly urging said slidable member into an intermediate position; an articulate connection between the slidable member and the actuating lever for varying said speed ratio in response to displacements of said slidable member in such a way as to reduce the angular velocity of said output end upon displacements of said slidable member in response to pressing forces between said members and to increase the angular velocity of said output end upon displacements of said slidable member in response to tensioning forces generated between said members whereby to equalize the peripheral speeds of wheels on which said tractor component and said trailer component are mounted; and means operatively connected with said articulate connection for retarding the movements of said actuating lever in response to displacements of said slidable member.

10. In a vehicle train comprising a wheel-mounted tractor component having a rearwardly extending engine-driven shaft and a trailer component having a live axle, in combination: a drive connection between said shaft and said axle supported by one of said components and including a variable speed transmission, said transmission having an input end driven at the rate at which said shaft is driven, an output end controlling the rate at which said axle is driven, and an actuating lever for varying the speed ratio between said input end and said output end; a trailer hitch comprising a first member attached to one of said components, a second member attached to that component which supports said drive connection and articulately connected with said first member, said second member being slidable between two extreme positions longitudinally of its component, and resilient means for constantly urging said second member into an intermediate position; an articulate connection between the second member and the actuating lever for varying said speed ratio in response to displacements of said second member in such a way as to reduce the angular velocity of said output end upon displacements of said second member in response to pressing forces between said members and to increase the angular velocity of said output end upon displacements of said second member in response to tensioning forces generated between said members whereby to equalize the peripheral speeds of wheels on which said tractor component and said trailer component are mounted, said articulate connection including an element so mounted as to follow the movements of said second member in the same directions; and means operatively connected with said articulate connection for retarding the movements of said actuating lever in response to displacements of said second member, said last mentioned means comprising a damping cylinder having a piston connected with the element of said articulate connection.

11. In a vehicle train comprising a wheel-mounted tractor component having a rearwardly extending engine-driven shaft, and a wheel-mounted trailer component having a live axle, in combination: a drive connection between said shaft and said axle, said drive connection including a second shaft driven by said first mentioned shaft, a variable speed transmission having an input shaft parallel with and driven by said second shaft at a rate directly proportional with the rate at which said first mentioned shaft is driven, an output shaft, and an actuating lever for varying the speed ratio between said input shaft and said output shaft, said drive connection further comprising an operative connection between said output shaft and said axle; a draft coupling between said trailer component and said tractor component; a linkage for connecting said draft coupling with said actuating lever in such a way as to vary the speed ratio between said input shaft and said output shaft of said transmission in response to axial forces generated in said draft coupling when the wheels on which said tractor component and said trailer component are mounted rotate at different peripheral speeds; and means for retarding the movements of said actuating lever operatively connected with said linkage.

12. In a vehicle train comprising a wheel-mounted tractor-component having a rearwardly extending engine-driven shaft, and a wheel-mounted trailer component having a live axle, in combination: a drive connection between said shaft and said axle, said drive connection including a second shaft driven by said first mentioned shaft, a variable speed transmission having an input shaft parallel with and driven by said second shaft at a rate directly proportional with the rate at which said first mentioned shaft is driven, an output shaft, and an actuating lever for varying the speed ratio between said input shaft and said output shaft, said drive connection further comprising an operative connection between said output shaft and said axle; a draft coupling between said trailer component and said tractor component; and a linkage for connecting said draft coupling with said actuating lever in such a way as to vary the speed ratio between said input shaft and said output shaft of said transmission in response to axial forces generated in said draft coupling when the wheels on which said tractor component and said trailer component are mounted rotate at different peripheral speeds.

13. In a vehicle train comprising a wheel-mounted tractor component having an engine and a rearwardly extending shaft driven by said engine, and a wheel-mounted trailer component having a live axle, in combination: a drive connection between said shaft and said axle, said connection including a second shaft driven at the rate at which said first-mentioned shaft is driven, a variable speed transmission having an input shaft parallel with said second shaft and driven at a speed less than one-half of the angular velocity of said second shaft, an output shaft, and an actuating lever for varying the speed ratio between said input shaft and said output shaft, said drive connection further comprising a differential gearing operatively connected with said output shaft, coaxial with said second shaft and operatively connected with said axle for driving same; a draft coupling comprising a pair of articulately interconnected members each attached to one of said components, one of said members being slidable between two extreme positions longitudinally of its component, said draft coupling further comprising resilient means for constantly urging said slidable member into an intermediate position; a linkage connecting said slidable member with the actuating lever of said transmission for varying the speed ratio between said input shaft and said output shaft in response to forces generated between said members, said linkage operating in such a way as to increase the angular velocity of said output shaft upon displacements of said slidable member in one direction in response to tensioning forces between said members and to reduce the angular velocity of said output shaft in response to pressing forces between said members whereby to equalize the peripheral speeds of wheels on which said components are mounted, said linkage comprising at least one elongated member; and means for retarding the movements of said linkage and of said actuating lever operatively connected with said elongated member.

14. In a vehicle train comprising a wheel-mounted tractor component having an engine and a rearwardly extending shaft driven by said engine, and a wheel-mounted trailer component having a live axle, in combination: a drive connection between said shaft and said axle, said connection including a second shaft driven at the rate at which said first-mentioned shaft is driven, a variable speed transmission having an input shaft parallel with said second shaft and driven at a speed less than one-half of the angular velocity of said second shaft, an output shaft, and an actuating lever for varying the speed ratio between said input shaft and said output shaft, said drive connection further comprising a differential gearing operatively connected with said output shaft, coaxial with said second shaft and operatively connected with said axle for driving same; a draft coupling comprising a pair of articulately interconnected members each attached to one of said components, one of said members being slidable between two extreme positions longitudinally of its component, said draft coupling further comprising resilient means for constantly urging said slidable member into an intermediate position; and a linkage connecting said slidable member with the actuating lever of said transmission for varying the speed ratio between said input shaft and said output shaft in response to forces generated between said members, said linkage operating in such a way as to increase the angular velocity of said output shaft upon displacements of said slidable member in one direction in response to tensioning forces between said members and to reduce the angular velocity of said output shaft in response to pressing forces between said members whereby to equalize the peripheral speeds of wheels on which said components are mounted, said linkage comprising at least one elongated member.

15. In a vehicle train comprising a wheel-mounted tractor component having an engine and a rearwardly extending shaft driven by said engine, and a wheel-mounted trailer component having a live axle, in combination: a mechanical drive connection between said shaft and axle including a variable speed transmission, said transmission having an input end driven by said shaft, an output end for driving said axle, and operating means for varying the speed ratio between said input end and said output end; a draft coupling comprising a pair of articulately connected members each connected to one of said components, one of said members being slidable between two extreme positions longitudinally of its component, said draft coupling further comprising resilient means for constantly urging said slidable member into an intermediate position; at least one elongated connecting element constituting a linkage between said slidable member and the operating means of said transmission for varying the speed ratio between the input and output end thereof in response to displacements of said slidable member from said intermediate position, said linkage operating in such manner as to increase the angular velocity of said output end upon displacements of said slidable member in one direction from said intermediate position in response to tensional forces generated between said members and to reduce the angular velocity of said output end upon displacements of said slidable member in the other direction from said intermediate position in response to pressing forces generated between said members whereby to automatically equalize peripheral speeds of wheels on which said components are mounted; and means for varying the length of said connecting element.

16. In a vehicle train comprising a wheel-mounted tractor component having an engine and a rearwardly extending shaft driven by said engine, and a wheel-mounted trailer component having a live axle, in combination: a mechanical drive connection between said shaft and said axle including a variable speed transmission, said transmission having an input end driven by said shaft, an output end for driving said axle, and operating means for varying the speed ratio between said input end and said output end; a draft coupling comprising a pair of articulately connected members each connected to one of said components, one of said members being slidable between two extreme positions longitudinally of its component, said draft coupling further comprising resilient means for constantly urging said slidable member into an intermediate position; a linkage comprising at least one elongated rod between said slidable member and the operating means of said transmission for varying the speed ratio between the input and output end thereof in response to displacements of said slidable member from said intermediate position, said linkage operating in such manner as to increase the angular velocity of said output end upon displacements of said slidable member in one direction from said intermediate position in response to tensional forces generated between said members and to reduce the angular velocity of said output end upon displacements of said slidable member in the other direction from said intermediate position in response to pressing forces generated between said members whereby to automatically equalize peripheral speeds of wheels on which said components are mounted; a turnbuckle in said rod for varying the length thereof; and a damping cylinder having a piston connected with said rod for retarding the movements thereof in response to displacements of said slidable member.

17. In a vehicle train comprising a wheel-mounted tractor component having an engine and a rearwardly extending shaft driven by said engine, and a wheel-mounted trailer component having a live axle, in combination: a mechanical drive connection between said shaft and said axle including a variable speed transmission, said transmission having an input end driven by said shaft, an output end for driving said axle, and operating means for varying the speed ratio between said input end and said output end; a draft coupling comprising a pair of articulately connected members each connected to one of said components, one of said members being slidable between two extreme positions longitudinally of its component, said draft coupling further comprising resilient means for constantly urging said slidable member into an intermediate position; a linkage comprising at least one elongated rod and connecting said slidable member with said operating means for varying the speed ratio between the input end and the output end of said transmission in response to displacements of said slidable member from said intermediate position, said linkage operating in such manner as to increase the angular velocity of said output end upon displacements of said slidable member in one direction from said intermediate position in response to tensional forces generated between said members and to reduce the angular velocity of said output end upon displacements of said slidable member in the other direction from said intermediate position in response to pressing forces generated between said members whereby to automatically equalize peripheral speeds of wheels on which said components are mounted; and means operatively connected with said slidable member for releasably holding same in a selected position between said two extreme positions thereof.

18. In a vehicle train comprising a wheel-mounted tractor component having an engine and a rearwardly extending shaft driven by said engine, a wheel-mounted trailer component having a live axle, and brake means for said tractor and said trailer component, in combination: a mechanical drive connection between said shaft and said axle including a variable speed transmission, said transmission having an input end driven by said shaft, an output end for driving said axle, and operating means for varying the speed ratio between said input end and said output end; a draft coupling comprising a pair of articulately connected members each connected to one of said components, one of said members being slidable between two extreme positions longitudinally of its component, said draft coupling further comprising resilient means for constantly urging said slidable member into an intermediate position; a linkage comprising at least one elongated rod for connecting said slidable member with said operating means for varying the speed ratio between the input end and the output end of said transmission in response to displacements of said slidable member from said intermediate position thereof, said linkage operating in such manner as to increase the angular velocity of said output end upon displacements of said slidable member in one direction from said intermediate position in response to tensional forces generated between said members and to reduce the angular velocity of said output end upon displacements of said slidable member in the other direction from said intermediate position thereof in response to pressing forces generated between said members whereby to automatically equalize peripheral speeds of wheels on which said components are mounted; and means operatively connected with said slidable member for releasably holding same in a selected position between said two extreme positions thereof when said brake means is operated.

19. In a vehicle train comprising a wheel-mounted tractor component having an engine and a rearwardly extending shaft driven by said engine, a wheel-mounted trailer component having a live axle, and a braking device for the wheels of said components, in combination: a mechanical drive connection between said shaft and said axle including a variable speed transmission, said transmission having an input end driven by said shaft, an output end for driving said axle, and operating means for varying the speed ratio between said input end and said output end; a draft coupling comprising a pair of articulately connected members with the first member connected to said tractor component and the second member connected to said trailer component, said second member being slidable between two extreme positions longitudinally of its component, said draft coupling further comprising resilient means for constantly urging said second member into an intermediate position; a linkage comprising at least one elongated rod for connecting said second member with said operating means for varying the speed ratio between the input end and the output end of said transmission in response to displacements of said second member from said intermediate position thereof, said linkage operating in such manner as to increase the angular velocity of said output end upon displacements of said second member in one direction from said intermediate position in response to tensional forces generated between said members and to reduce the angular velocity of said output end upon displacements of said second member in the other direction from said intermediate position thereof in response to pressing forces generated between said members whereby to automatically equalize peripheral speeds of wheels on which said components are mounted; means for varying the length of said elongated rod; and means operatively connected with said second member for releasably holding same in a selected position between said two extreme positions thereof, said last mentioned means comprising an arresting member movable into engagement with and away from said second member and operatively connected with said braking device in such a manner as to engage and arrest said second member when said braking device is operated and to release said second member when said braking device is released.

20. In a vehicle train comprising a wheel-mounted tractor component having an engine, a differential, a block for said differential, and a rearwardly extending shaft driven by said engine, and a wheel-mounted trailer component having a live axle, in combination: a mechanical drive connection between said shaft and said axle including a variable speed transmission, said transmission having an input end driven by said shaft, an output end for driving said axle, and operating means for varying the speed ratio between said input end and said output end; a draft coupling comprising a pair of articulately connected members each connected to one of said components, one of said members being slidable between two extreme positions longitudinally of its component, said draft coupling further comprising resilient means for constantly urging said slidable member into an intermediate position; a linkage comprising at least one elongated rod for connecting said slidable member with said operating means for varying the speed ratio between the input end and the output end of said transmission in response to displacements of said slidable member from said intermediate position thereof, said linkage operating in such manner as to increase the angular velocity of said output end upon displacements of said slidable member in one direction from said intermediate position in response to tensional forces generated between said members and to reduce the angular velocity of said output end upon displacements of said slidable member in the other direction from said intermediate position in response to pressing forces generated between said members whereby to automatically equalize peripheral speeds of wheels on which said components are mounted; and means operatively connected with said slidable member for holding same in a selected position against the forces generated between said members and against the forces of said resilient means, said last mentioned means comprising an arresting member movable into engagement with and away from said slidable member and operatively connected with said block, said arresting member operating in such manner as to engage and arrest said slidable member when said block is operated and to release said slidable member when said block is released.

21. In a vehicle train comprising a wheel-mounted tractor component having an engine, a differential, a block for said differential, and a rearwardly extending shaft driven by said engine, and a wheel-mounted trailer component having a live axle, in combination: a mechanical drive connection between said shaft and said axle including a variable speed transmission, said transmission having an input end driven by said shaft, an output end for driving said axle, and operating means for varying the speed ratio between said input end and said output end; a draft coupling comprising a pair of articulately connected members each connected to one of said components, one of said members being slidable between two extreme positions longitudinally of its component, said draft coupling further comprising resilient means for constantly urging said slidable member into an intermediate position; a linkage comprising at least one elongated rod for connecting said slidable member with said operating means for varying the speed ratio between the input end and the output end of said transmission in response to displacements of said slidable member from said intermediate position thereof, said linkage operating in such manner as to increase the angular velocity of said output end upon displacements of said slidable member in one direction from said intermediate position in response to tensional forces generated between said members and to reduce the angular velocity of said output end upon displacements of said slidable member in the other direction from said intermediate position in response to pressing forces generated between said members whereby to automatically equalize peripheral speeds of wheels on which said components are mounted; and means operatively connected with said slidable member for holding same in a selected position against the forces generated between said members and against the forces of said resilient means, said last mentioned means comprising an arresting member movable into engagement with and away from said slidable member; and a hydraulic connection between said arresting member and said block for moving said arresting member into engagement with said slidable member when said block is operated and for moving said arresting member away from said slidable member when said block is released.

22. In a vehicle train comprising a wheel-mounted tractor component having an engine and a rearwardly extending shaft driven by said engine, a wheel-mounted trailer component having a live axle and brake means for said tractor and said trailer component, in combination: a mechanical drive connection between said shaft and said axle including a variable speed transmission, said transmission having an input end driven by said shaft, an output end for driving said axle, and operating means for varying the speed ratio between said input end and said output end; a draft coupling comprising a pair of articulately connected members each connected to one of said components, one of said members being slidable between two extreme positions longitudinally of its component, said draft coupling further comprising resilient means for constantly urging said slidable member into an intermediate position; a linkage comprising at least one elongated rod for connecting said slidable member with said operating means for varying the speed ratio between the input end and the output end of said transmission in response to displacements of said slidable member from said intermediate position thereof, said linkage operating in such manner as to increase the angular velocity of said output end upon displacements of said slidable member in one direction from said intermediate position in response to tensional forces generated between said members and to reduce the angular velocity of said output end upon displacements of said slidable member in the other direction from said intermediate position thereof in response to pressing forces generated between said members whereby to automatically equalize peripheral speeds of wheels on which said components are mounted; and means operatively connected with said slidable member for releasably holding same in a selected position between said two extreme positions thereof when said brake means is operated, said last mentioned means comprising arresting means having a first position in which said slidable member is arrested and a second position in which said slidable member is released, and a hydraulic connection between said brake means and said arresting means for moving said arresting means into said first position when said brake means is actuated and for moving said arresting means into said second position when said brake means is released.

No references cited.